Oct. 24, 1967     H. D. RICE ET AL     3,348,264
APPARATUS FOR MAKING PICTORIAL PARALLAX PANORAMAGRAM UNITS
Original Filed May 14, 1962

INVENTORS,
HAROLD D. RICE
SAM L. LEACH
BY Jacobi & Davidson
ATTORNEYS

United States Patent Office 3,348,264
Patented Oct. 24, 1967

3,348,264
APPARATUS FOR MAKING PICTORIAL
PARALLAX PANORAMAGRAM UNITS
Harold D. Rice, Leawood, Kans., and Sam L. Leach, St. Louis, Mo., assignors, by mesne assignments, to PID Corporation, Beverly Hills, Calif., a corporation of California
Continuation of application Ser. No. 436,974, Jan. 6, 1965, which is a division of application Ser. No. 202,930, May 14, 1962, now Patent No. 3,241,429, dated Mar. 22, 1966. This application Jan. 11, 1967, Ser. No. 608,704
5 Claims. (Cl. 18—10)

This application is a continuation of Ser. No. 436,974, filed Jan. 6, 1965, now abandoned, which in turn is a division of Ser. No. 202,930 filed May 14, 1962, and issued Mar. 22, 1966, as U.S. Patent No. 3,241,429.

This invention relates broadly to apparatus for making optical display units, and is particularly concerned with the provision of apparatus for making optical display units incorporating lenticular screens. Such display units are generically known in the art as "pictorial parallax panoramagram units."

In order to understand the various aspects which underlie the formation and use of the panoramagram units, and the basic processes by which panoramagram units can be fabricated reference is made to our aforementioned Patent No. 3,241,429, the disclosure of which is incorporated herein by reference.

With respect to the preferred modified embodiment of the aforesaid patent wherein a pictorial parallax panoramagram unit is formed with the image layer directly printed on the plastic, lenticular screen, the primary object hereof is the provision of an apparatus including, in combination, extruding means adapted to extrude a thin layer of flexible material, and forming means adapted to receive such layer and form a series of adjacent lens elements in one face thereof while simultaneously setting the plastic in its final dimensionally stable form and providing a guide edge thereon.

In accordance with the basic aspects hereof, a pictorial parallax panoramagram unit comprises a flexible optical display. The display includes a lenticulated image layer and a lenticular screen having a base face and a lenticulated forward face. The image layer is fixed in direct contact with the base face of the screen, and in alignment with the lenticles defined by the forward face thereof. Preferably, the focal point of the lenticles of the screen lie at least substantially in the plane of the image layer—i.e., at a point which affords the best optical clarity with a planar rear face adjacent the image layer.

The invention as a whole will be better understood when consideration is given to the following detailed description thereof. Such description refers to the annexed drawings, presenting preferred and illustrative embodiments of the invention.

Figure 1:
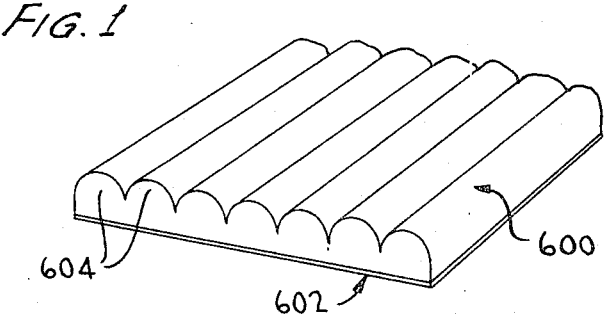
FIGURE 1 is a fragmental elevational view of one form of pictorial parallax panoramagram unit which can be produced with the apparatus of this invention.
Figure 2:
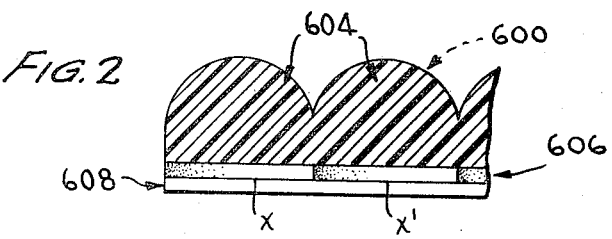
FIGURE 2 is an enlarged fragmental sectional view of the panoramagram unit shown in FIGURE 1, FIGURE 2 presenting an exaggeration of the image layer for purposes of explanation.

Referring now to the drawing, and more particularly to FIGURES 1 and 2 thereof, one form of pictorial parallax panoramagram unit which can be produced with a lenticular screen formed by the apparatus of this invention will be seen. The ultimate unit includes a flexible plastic, lenticular screen 600 carrying an image layer 602 directly printed on the base face thereof. The lenticular screen 600 has a plurality of lenticular lens elements 604 formed therein.

The lenticular screen itself may generally correspond to the lenticular screen discussed in our aforementioned patent with reference to the various embodiments thereof. Generally, as pointed out therein, the individual lenticles or lens elements 604 have a maximum width on the order of about 0.015 inch. Except as pointed out herein the specific details of the screen as to materials, etc., are not critical to the use and operation of the apparatus of this invention.

The image may be directly printed on the rear face of the screen 600 of FIGURE 1. Moreover, as opposed to merely printing a single layer of ink, for example, in optical and illusion creating registry with the lenticular screen, and on the rear face thereof, in instances where an opaque unit is desired, an additional layer of printing should be applied. In this regard, specific reference should be made to FIGURE 2 wherein the screen 600 is shown as carrying on the rear face thereof, a first layer of printing designated by the numeral 606, and a second layer of printing disposed in underlying relation to the rear face of the first layer. The second layer is designated as 608 and in the normal instance, would be a layer of white ink or an ink of a suitable pastel color.

The layer 600 has been suggested as being a single layer, and for a black and white unit would, in fact, be a single impression. However, the layer 606 can comprise a color lenticlated image layer, in which event the layer can be formed by successive printing operations which deposit inks of varying color in selected locations to produce the ultimate display, i.e., the layer can be produced by conventional color separation techniques. Of course, it will be remembered that the layer 606, regardless of the manner in which it is deposited or applied is a lenticulated image including panels underlying the respective lens element 604 and in proper registry therewith for the particular type of panoramagram unit being produced.

In FIGURE 2, the layer 606 is shown as being formed to present a true three-dimensional picture and comprises panels x and x′, each of which underlies one lens element 604 and covers the area between opposed longitudinal edges thereof. Details as to the registry of the panels of the lenticulated image layer for various pictorial parallax panoramagram units will be found in our aforementioned patent.

To produce the product of FIGURES 1 and 2, as well as other products of like character, requires the initial availability of a flexible lenticular screen adapted to receive an image layer printed directly thereon. Thus, in contrast with forming the lenticular screen as more or less the final step in the production of a unit as is the case with certain embodiment of our aforementioned patent, the modification hereof contemplates forming the lenticular screen initially and thereafter applying the image layer thereto.

The apparatus provided hereby for forming the lenticular screen contemplates extruding a sheet of plastic in generally fluid form, and then while the sheet is sufficiently molten, forming lenticles in one face thereof while simultaneously polishing the other face thereof and setting the plastic in a dimensionally stable state. Moreover, the apparatus contemplates the simultaneous slitting of the extruded sheet to provide a guide edge thereon which is in exact and proper parallelism with the longitudinal axis of the lenticles formed in the material.

Preferably, for convenience in storage and handling, the extruded sheets having one surface thereof formed with lenticles therein, are rolled in continuous lengths to provide a package of suitable dimension, and subsequently, the continuous lengths are severed into segments of suitable size by cutting the sheets transversely. The transverse cutting operation is carried out by using the slit side guide edge as a reference so that the severed segments have one edge which is exactly parallel with the longitudinal axis of the lenticles, and an adjacent edge which extends perpendicularly to the one side edge or the longitudinal axis of the lenticles.

Figure 3:
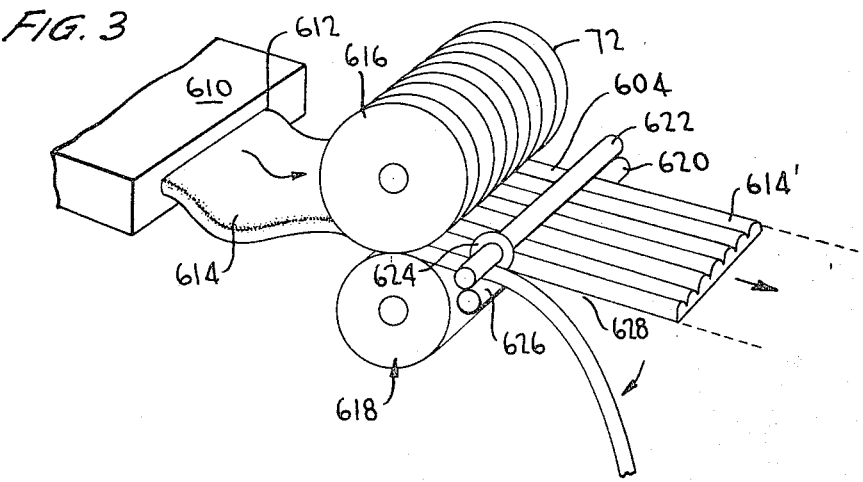
FIGURE 3 is a fragmental perspective view of an apparatus according to this invention adapted to form sheet stock for use in making panoramagram units in accordance with the construction presented in FIGURES 1 and 2.

A suitable apparatus for forming lenticular screens according to this invention is schematically presented in FIGURE 3. This apparatus includes an extrusion means of conventional design having an extrusion head 610 with a generally rectangular extrusion opening 612 therein. From such opening in accordance with conventional plastic handling techniques, a generally mobile and fluid sheet structure 614 is obtained. This sheet structure is, while still heated and easily formable, fed between a pair of cooperating rolls 616 and 618. The roller 616 has a series of parallel grooves 72 extending about the periphery thereof, and these grooves serve to form in the upper surface of the sheet structure 614, parallel lenticles or lens elements 604. The roll 618 comprises a cylinder having a highly polished and preferably chrome-plated, peripheral surface.

The sheet structure 614 is slightly compressed during its passage between the cooperating rolls 616 and 618 to cause the polishing of the underside of the structure and the formation of the lenticles in the upper face of the structure.

In order to provide a guide edge on the formed sheet structure, which is designated by the numeral 614, a slitting operation is performed simultaneously with the initial forming steps discussed above. As shown in FIGURE 3, a pair of cooperating shafts 620 and 622 are supported in parallel relation on opposite sides of the sheet structure 614, and immediately to the right of the cooperating rollers 616 and 618. The roller 622 carries a projecting, circular knife element 624, and the shaft 622 has a recess 626 formed therein. The recess 626 is aligned with the knife element 624 and receives a portion of the projecting edge thereof. The knife element 624 and recess 626, are disposed inwardly of one edge, the forward edge as shown in FIGURE 3, of the sheet structure 614', and in alignment with a junction between two lenticles 604. Thus, the circular knife element 624 serves to slit the sheet structure 614' parallel to the longitudinal axis of the lenticles formed therein.

It should be understood here that the plastic used to form the sheet structure 614 should have a set temperature between 0° F. and 72° F. so that the same is dimensionally stable upon leaving the embossing roller 616. If desired, or necessary, as can be normal, a conventional cooling means, including cooling passages in roller 616 and means for cooling fluid therethrough can be used to cause the plastic to set as it is formed and moves past roller 616.

The sheet structure 614', which leaves the assembly of FIGURE 3, can be rolled in a conventional manner on a suitable core and stored for subsequent use. When it is desired to produce the final product, the roll is passed into a cutter, and the severed edge 628 resulting from the cutting operation described above, is used as a cutting guide. The continuous sheet is severed into suitable segments by cutting the same perpendicular to the longitudinal axis of the lenticles using the edge 628 to set the cutter so as to maintain the perpendicular relationship. Conventional cutters can be used for this purpose, as well as conventional alignment means incorporated thereon.

Once severed segments of a sheet structure such as that designated by 614 above, are available, the remaining step in the process of forming the unit of FIGURE 1 lies in the printing of the image layer directly on the flat face or rear face thereof. Details of the techniques and equipment utilized for this purpose will be found in our aforementioned patent.

In the preceding detailed discussion, the products hereof have been considered as including lenticles or lens elements having an arcuate forward surface comprising a part of a circle. Moreover, each lens element has been shown and described as having a flat rear surface. These features facilitate production with comparatively inexpensive equipment, but certain advantages can be achieved by modifying the shape of the lens elements. Specifically, in accordance with such modification, correction is made for spherical abberation, as well as for variation in focal plane thereof. However, modified types of screens as explained in detail in our aforementioned patent may be provided for particular purposes.

After reading the foregoing detailed description of the illustrative and preferred embodiments of the instant invention, it should be apparent that the objects of this specification have been successfully achieved. Accordingly,

What is claimed is:

1. Apparatus for forming lenticulated sheet stock suitable for use in optical parallax units comprising, in combination, simultaneously operative and juxtaposed means for extruding a formable plastic sheet, means for embossing one face of said sheet with equally shaped adjacent arcuate lens ribs extending longitudinally of said sheet and having a maximum width on the order of about 0.015 inch, said embossing means including a roller having its longitudinal axis extending across the path of said sheet being fed from said extruding means, the surface of said roller defining a plurality of juxtaposed, circumferentially extending concave portions for shaping said ribs, adjacent concave portions on said surface of said roller meeting at axially spaced junctions, and means for severing said sheet along the junction between two of said ribs to provide a guide edge on said sheet exactly parallel to said junction, said severing means including a cutting edge extending longitudinally of the path of travel of said sheet and positioned aligned exactly with one of said junctions on said sheet.

2. Apparatus according to claim 1 wherein said embossing means further includes a coperating polishing roller having its longitudinal axis extending across the path of said sheet being fed from said extruding means, the surface of said polishing roller being highly polished and cooperating wtih said first-mentioned roller to define a nip for receiving said sheet from said extruding means.

3. Apparatus according to claim 2 wherein said polishing roller is chrome-plated.

4. Apparatus according to claim 1 further including means for cooling said first-mentioned roller to set said plastic sheet as it is formed and moves past said first-mentioned roller.

5. Apparatus for forming lenticulated sheet stock suitable for use in optical parallax units comprising, in combination, simultaneously operative and juxtaposed means for extruding a formable plastic sheet, means for embossing one face of said sheet with equally shaped adjacent arcuate lens ribs extending longitudinally of said sheet and having a maximum width on the order of about 0.015 inch, said embossing means including a roller having its longitudinal axis extending across the path of said sheet being fed from said extruding means, the surface of said roller defining a plurality of juxtaposed, circumferentially extending concave portions for shaping said ribs, adjacent concave portions on said surface of said roller meeting at axially spaced junctions, and means for severing said sheet at least parallel to the junction between two of said ribs to provide a guide edge on said sheet exactly parallel to said junction, said severing means including a cutting edge extending longitudinally of the path of travel of said sheet and positioned aligned exactly parallel with one of said junctions on said sheet.

No references cited.

WILLIAM J. STEPHENSON, *Primary Examiner.*